March 22, 1938.   D. M. RITCHIE   2,111,676
ARTICULATED CAR AND TRUCK
Filed Feb. 23, 1935   5 Sheets-Sheet 1

INVENTOR
DAVID M. RITCHIE.
BY Toulmin & Toulmin
ATTORNEYS

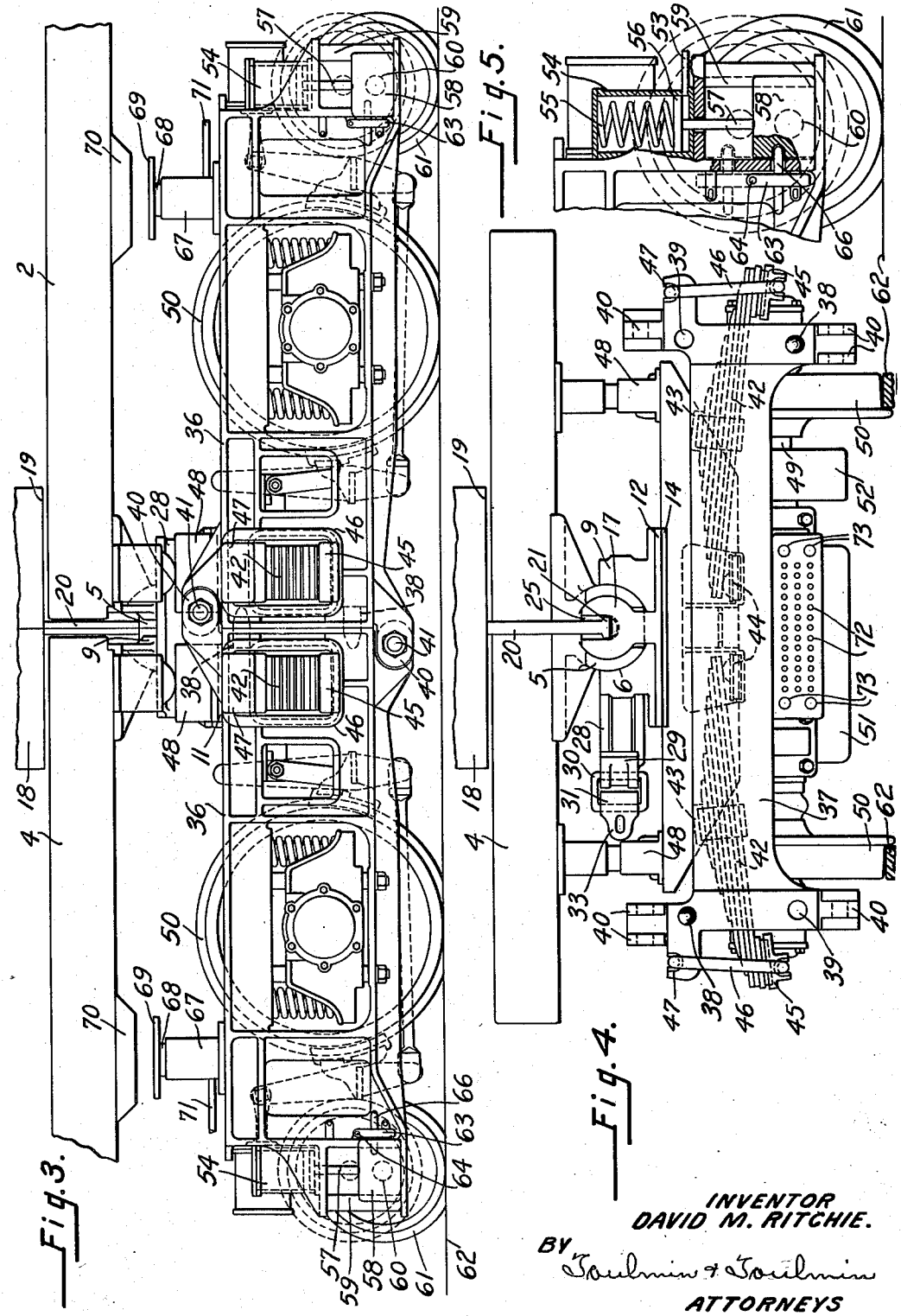

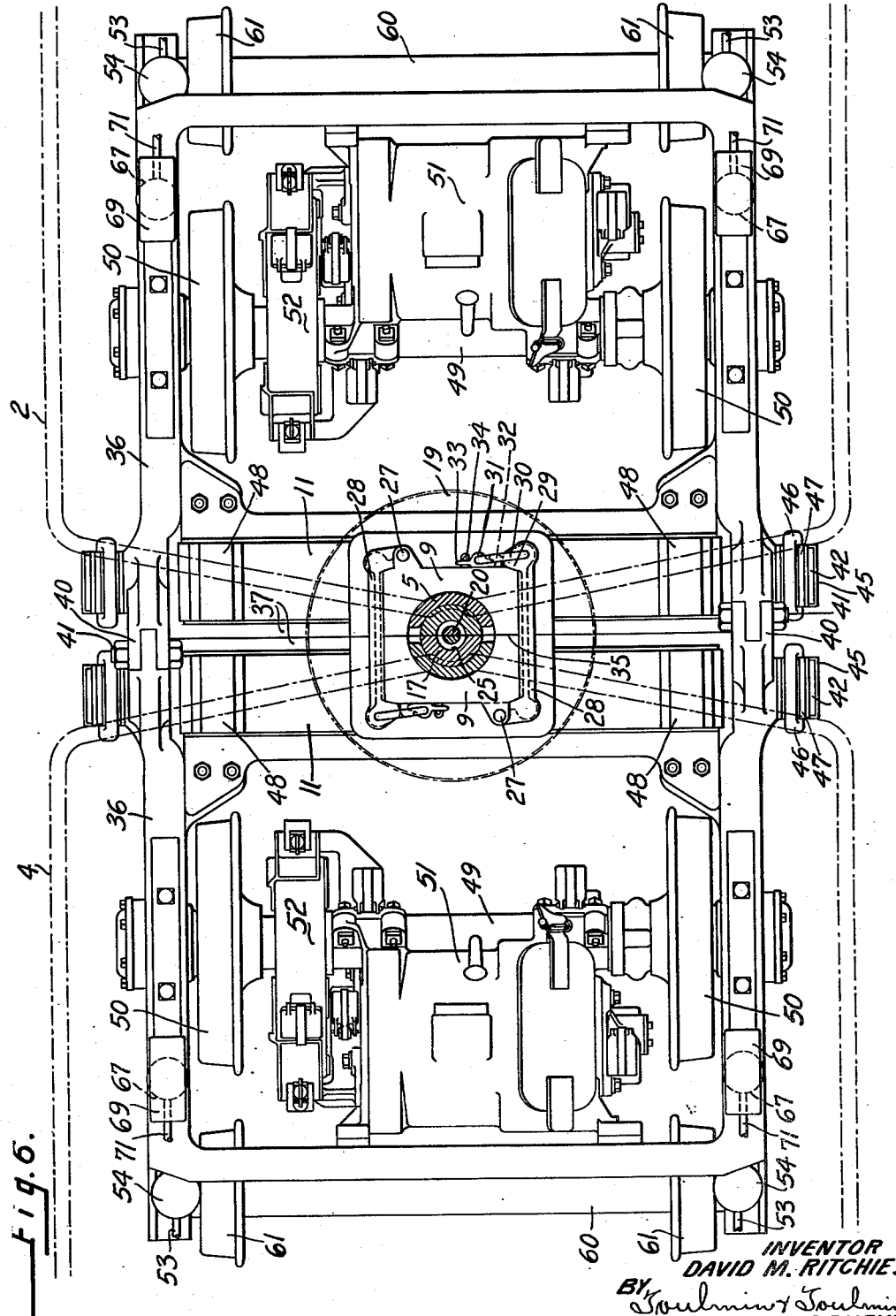

March 22, 1938.  D. M. RITCHIE  2,111,676
ARTICULATED CAR AND TRUCK
Filed Feb. 23, 1935   5 Sheets-Sheet 4

INVENTOR
DAVID M. RITCHIE.
BY Toulmin & Toulmin
ATTORNEYS

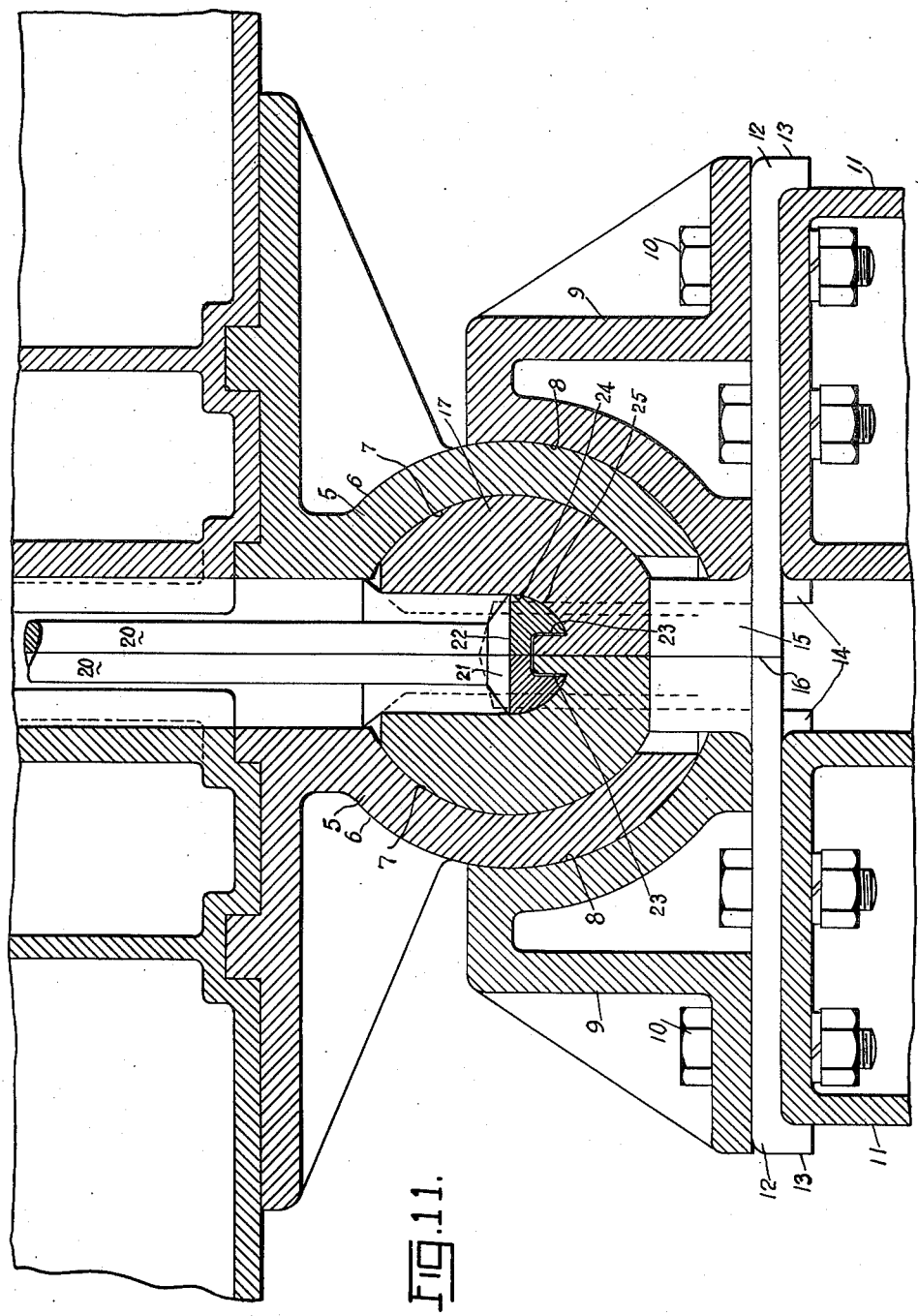

Patented Mar. 22, 1938

2,111,676

UNITED STATES PATENT OFFICE 2,111,676

ARTICULATED CAR AND TRUCK

David M. Ritchie, Cincinnati, Ohio, assignor to The Cincinnati Traction Bldg. Company, Cincinnati, Ohio, a corporation of Ohio Application February 23, 1935, Serial No. 7,752

18 Claims. (Cl. 105—4)

My invention relates to articulated cars.

It is the object of my invention to provide an articulated train, or a pair of articulated car bodies which are pivotally mounted for vertical and horizontal movement on a common truck, positioned beneath their adjacent ends, and in combination therewith I provide a vestibule so that the pasengers may pass from one car to the other without danger, and without impediment.

It is my object in such a combination, which is one of the novel features of my invention, to provide a truck that can quickly be separated into two independent component parts, each part carrying the trunnion and socket plate for supporting one of the car bodies and for supporting the vestibule, or one-half of the vestibule.

It is a further object to provide a supplementary wheel mechanism to be lowered and put into operation when the truck halves are separated.

It is an additional object to provide supplemental side bearings for use when the truck halves are separated.

It is an object to provide all of the advantages of a common truck between the adjacent ends of the cars, and all of the advantages of independent trucks when the halves are separated.

It will be understood in the present state of the art that the primary disadvantage of articulated cars has been that when once assembled they must remain in assembled condition. When it was desired to separate the cars this could be done only in the shop, and when so separated one of the cars was useless as it had no supporting truck under one end, and the other car was rendered useless because the truck that it had supporting it was not arranged to support it by itself. The result has been that articulated cars necessitated that the car bodies of the articulation always be treated as a unit. It was, therefore, impossible to separate the car bodies and use them independently if they were of the articulated type. Furthermore, the vestibule construction has been such that it could be utilized only when the cars were assembled, and if they were disassembled special means, such as ropes and chains had to be utilized to temporarily restrain the vestibule from falling away from the end of the car with which it was still associated.

It is the object of my invention to provide a truck that is composed of two parts that can be joined together quickly and permanently, and operated as a single truck beneath the adjacent ends of the car bodies, and on which truck the car bodies have universal trunnions for movement in the vertical and horizontal positions.

It is a further object to so arrange these trucks that they may divide on the same plane on which the car ends abut, and on which the vestibule is divided.

It is an object to support each half of the vestibule on each half of the truck.

It is an object to provide means of providing an additional pair of wheels when the truck is severed in two parts so that a more complete, that is, a four-wheel truck, can be provided when the main truck is separated into its component parts. By doing this, and upon occasion by supplying supplementary side bearings, when that becomes necessary, I provide a train that has all of the advantages of articulation and all of the advantages of independent cars.

Referring to the drawings:

Figure 3 is a detail side elevation of the truck in coupled condition, with the main side bearings, supplementary side bearings, car platform ends, etc. proportionally enlarged in order to bring out the structural arrangement.

Figure 4 is an end elevation of one of the trucks when uncoupled from the other truck.

Figure 5 is a detail view, partially in section, through the raising and lowering mechanism for the supplementary wheels and axle of one of the trucks.

Figure 6 is a plan view of the assembled truck with the trunnions and vestibule support in section. The braking rigging has been left off this view in order to clarify it and simplify it, as the particular brake rigging forms no part of this invention.

Figure 11 is a detail illustration of the trunnion and the vestibule supporting-rod showing how they interlock rotatively so that when the truck moves through a curve the rod will be correspondingly moved rotatively.

Figure 8:
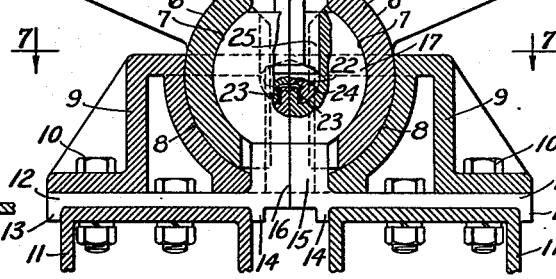
Figure 8 is a section on the line 8—8 of Figure 7.

Referring to the drawings in detail, 1 is a car body having a platform 2. 3 is an adjacent car body having a car platform 4. The car platform carries a depending, semi-spherical trunnion, which is shown in Figure 8, and designated 5. This trunnion has its exterior and interior walls described about a common center. The walls 6 and 7 are described on the surface of a sphere. The outer wall 6 rests within a similar surface 8 described about the same center as the surfaces 6 and 7. This surface 8 constitutes the bearing surface for the trunnion 5. The surface 8 is mounted on the face of the center plate or socket half 9, which is bolted by the bolts 10 to the bolster 11.

Interposed between the socket plate casting 9 on the top of the bolster 11 is a plate 12, having shoulders 13 and 14 engaging the sides of the bolster 11. This plate is provided with an upwardly projecting portion 15 having a flat, vertical face 16 and an arcuate portion 17 fitting within the trunnion cup against the face 7 thereof. This plate and its upwardly projecting portion constitute the means of positioning a trunnion so that it permits free longitudinal and vertical movement of the car body which it supports. It also acts as a support for the vestibule platform and vestibule drum in the following manner.

The vestibule drum 18 is preferably made in halves, each half of the drum being supported upon its half of the platform 19. Each half of the platform is supported upon its own supporting rod 20 that terminates at its bottom in an angular member or finger 21. This finger is provided with a shouldered portion 22 and a finger portion 23 having an arcuate face 24 fitting within the bottom of an arcuate slot or cup 25. This arrangement is such that as the truck rotates the vestibule will rotate with it. This permits of rocking movement of the rod 20 upon its universal support within the cup-shaped socket of the outwardly extending projection 17. Thus, each half of the structure in question consists of a car body having a car floor, a trunnion for universal movement in horizontal and vertical planes supporting the car body, a socket plate, and a retaining member for the trunnion in its socket plate, which also acts as a support for the vestibule platform and the vestibule casing, or one-half thereof.

The foregoing description should be read with Figure 11 of the drawings in view because in that way the movement of the vestibule by the supporting rod and movements of the trunnion will be made very plain.

Figure 9:
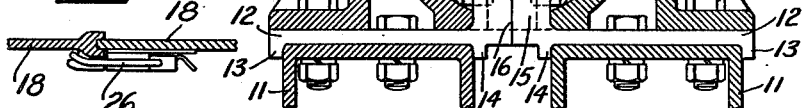
Figure 9 is a section on the line 9—9, looking in the direction of the arrows, on Figure 1, illustrating the nature of the joint of the halves of the vestibule drum and the nature of the locking device employed.
Figure 10:
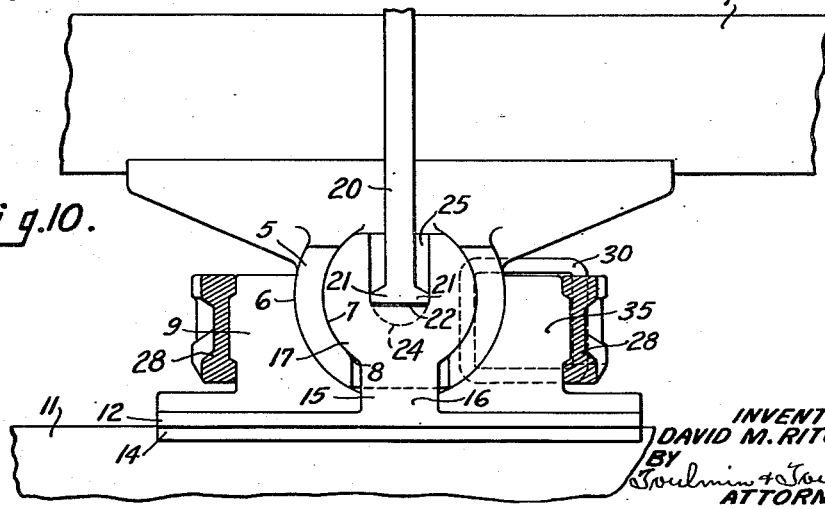
Figure 10 is a detail end elevation of the articulated joint and vestibule support as it appears when the trucks are parted.

The rod 20 is preferably made semi-circular in section so when it is joined with its companion half it forms a complete rod. The halves of the vestibule are joined together by locking clips 26 of any desired character. It is preferred that the halves of the vestibule have a male and female connection, as shown in Figure 9.

Figure 7:
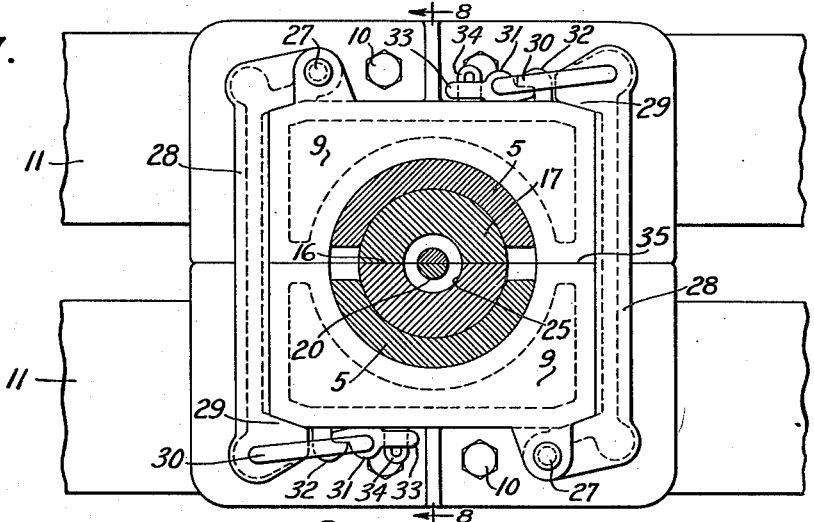
Figure 7 is a section on the line 7—7 of Figure 8.

The halves constituting the socket plate 9 are joined together by the locking members, shown in detail in Figure 7. On each half is pivoted, at 27, a locking lever 28 which when in locked position lies along the side of the halves of the socket plate and has its end 29 overlapping the opposite end of the half of the socket plate opposite to that on which the lever 28 is pivoted. On this head 29 is a locking bale 30 having a locking finger 31 engaging a retaining finger 32 on the adjacent socket plate. This locking finger 31 has an eye 33 mounted over a hasp 34, in which is placed a lock to prevent any unauthorized unlocking of this coupling.

When the two halves of the socket plate are thus locked they abut one another along their faces 35. The plane of their abutment is also the plane of abutment of the members 17 and of the halves of the vestibule supporting rod 20. This same plane is the plane of division of the halves of the vestibule platform and casing. This plane also defines the end of the frame of each half of the truck. This truck frame is designated 36. The ends of the adjacent truck frames are formed into end plates 37. The upper portions of this end plate 37 are provided with projecting male members 38 and sockets 39 on one truck, and a corresponding receiving socket and pin on the adjacent face of the other truck. Likewise, at the bottom of this face of the adjacent faces, the situation is reversed and the male members are on the opposite truck and the sockets 39 are on the truck that has the upper male members.

On either side of the truck frame, at the top thereof are overlapping interengaging ears 40 through which attaching bolts 41 are inserted for connecting the two halves of the truck one to the other. Each truck half is provided with a bolster 11, which is supported upon the semi-elliptical springs 42 at 43, the inner ends of which rest upon the frame bracket 44 and the outer ends upon the pad 45, that is swingingly supported by the side link 46 on the yoke 47 on the outsides of the frame 36.

The bolsters 11 are provided at their outer ends, as will be seen in Figure 6, with side bearings 48. These are the normal side bearings used exclusively when the cars are coupled together through the coupling of the trucks. The truck halves are each provided with an axle 49 and main wheels 50. If desired, motors 51 are mounted respectively on the axles 49 and the frame 46, and drive the axles through the gearing contained in the gear box 52.

It will be noticed in this construction that when the truck is assembled the truck is provided with its normal quota of four wheels and two axles, but with its two bolsters closely adjacent one another. When so coupled together the trunnions are permitted the freest movement in their socket plates, but the vestibule drum and the platform are supported in overlapping condition over the ends of the car bodies, and the entire structure travels as a unit, while at the same time having a freedom of movement inherent in the articulation.

When it is desired to separate the cars to operate them independently, the cars are detached by unlocking the vestibule lock 26, the socket plate lock 28 and its associated parts, the truck locking bolts 41, and the cars are pulled apart. Each car carries its half of the vestibule 18 and the supporting rod 20.

When the air is taken off or the line 53 the air in the cylinder 54 is exhausted and the spring 55, acting on the piston 56 and piston rod 57, forces downwardly the supplementary axle and bearing block 58 in the guide frame 59, thereby carrying downwardly the supplementary axle 60 and the supplementary wheels 61 until they engage the rails 62. Whereupon the lock 63 is swung downwardly on its pivot 64 so that the finger 66 is inserted in the line openings in the frame 59 and the bearing block 58. The block is then suitably locked in that position.

When it is desired to retract this wheel the lock is disengaged, the air is admitted through the pipe 53, the supplementary axle and wheels are lifted and the lock is inserted in its upper position, as indicated, so that the supplementary wheels and axle are locked out of operative position during the period the trucks are coupled together. When this supplementary pair of wheels and axle are lowered then I have a four-wheel truck that is suitable for operation with one car only.

Likewise, I provide supplementary side bearings consisting of the cylinders 67, pistons 68 and bearing plate 69 engaging with the bearing plate 70 on the under side of the car body. The admission of air from the brake system into this cylinder, through the pipe 71, serves to elevate the plate 69 and provide the side bearing that is desirable when the halves are being operated independently.

By this arrangement it is possible to readily couple and uncouple two cars without disturbing the articulation of the vestibule. This simple arrangement is effected without special tools, with a crane or cradle, and can be operated just as effectively outside of the shop as in it. It permits of the ready inspection of the trunnions, and permits of their lubrication without dismantling the entire articulation. It greatly increases the capacity of the rolling stock because each car is available by itself as a unit, whereas with articulated trains as they are now constructed, if anything happens to one car the entire articulated train is put out of service until the repair is made.

The numeral 72 designates the jump-over electrical connections, and 73 the jump-over air connections which are automatically made when the two trucks are joined together as a single truck by the bolts 41.

Figure 1:
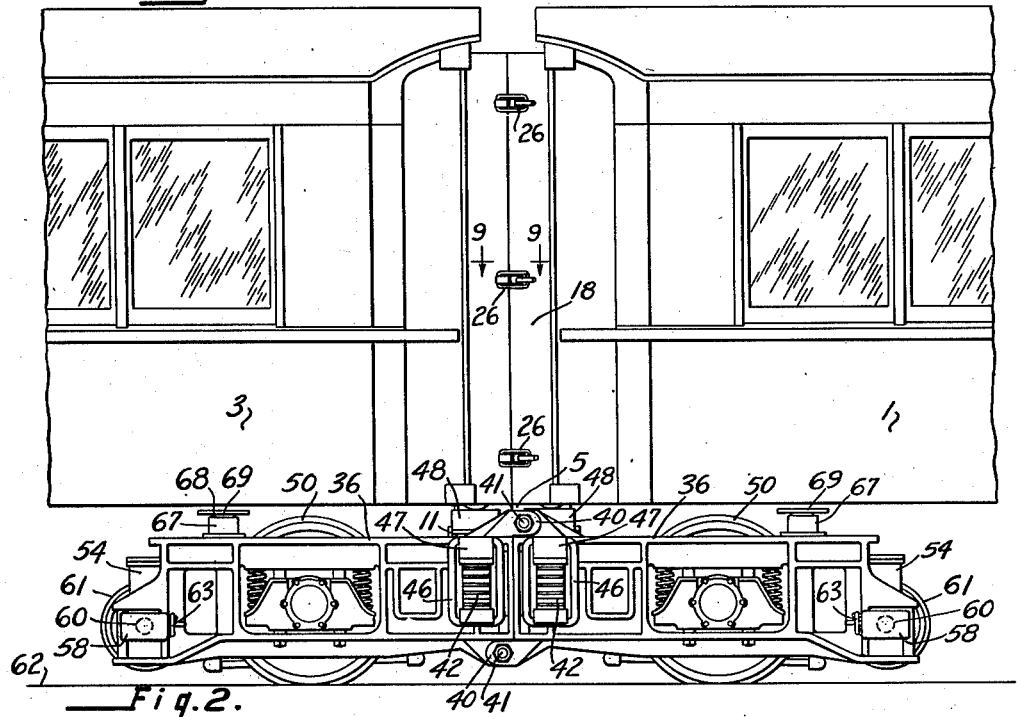
Figure 1 is a side elevation of the truck and cars coupled in a train, with the supplementary wheels raised and the supplementry side bearings lowered.
Figure 2:
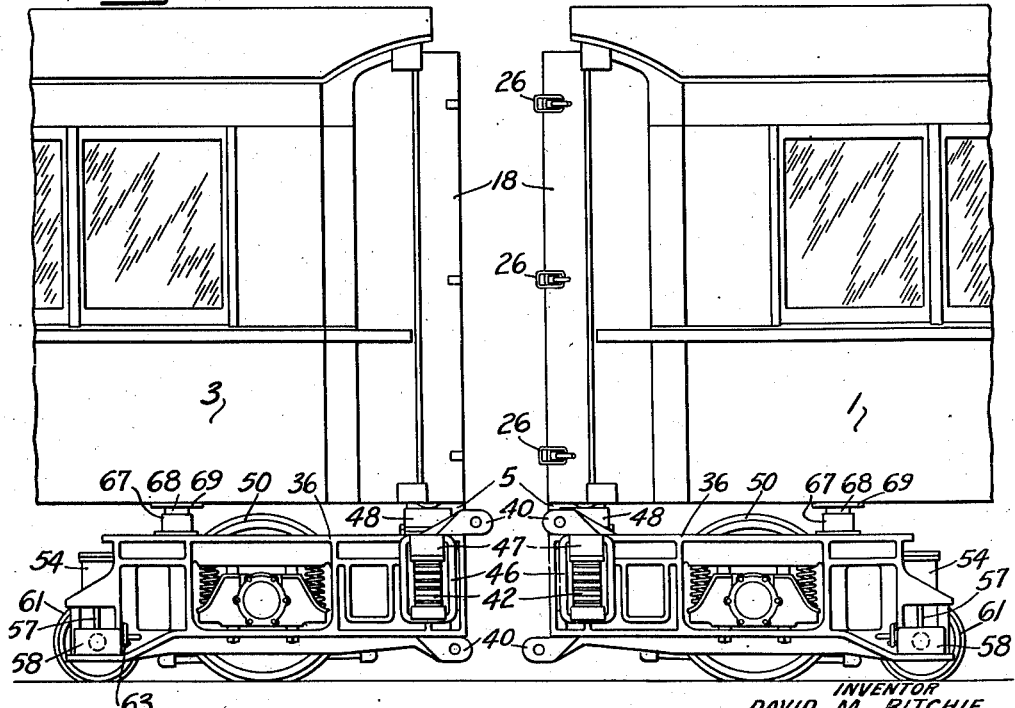
Figure 2 is a similar view, showing the truck divided into its component halves so that the halves can operate as independent trucks, with the vestibule separated and the supplementary wheels lowered and with the supplementary side bearings raised.

It will further be observed, by reference particularly to Figs. 1, 2, and 8, that my invention comprises a truck common to two car bodies, with supporting means on the truck for the adjacent ends of two cars. These supporting means are adapted to permit of the longitudinal separation of the cars; and the truck structure includes auxiliary or supplementary supporting means or wheels which are adapted to function as a supporting means for the adjacent car when the cars have been longitudinally separated from each other. And I further provide bearing plates, such as 69 best seen in Fig. 3, carried by the truck and adapted to make contact with the car body, as when the cars are longitudinally separated from each other at which time the supplementary or auxiliary truck wheels are adapted to function in a supporting capacity, which is facilitated by the contact then occurring between the truck with its supplementary or auxiliary wheels and the car body.

It will be understood that I desire to comprehend within my invention such modifications as come within the scope of the claims and the invention.

Having thus fully described my invention, what I claim as new and desire to secure by Letters Patent, is:

1. In combination, a car body having a trunnion at one end, a truck having a bolster and a socket plate thereon, said bolster and socket plate being located at one end of the truck, an axle and main wheels located intermediate the ends of the truck, a supplementary axle and wheels located on the end of the truck opposite to that on which is mounted the bolster, and means on the end of the truck adjacent the bolster for connecting said truck to a similar truck on an adjacent car.

2. In combination, a car body having a trunnion arranged for universal movement of the body in vertical and horizontal planes, a truck having an intermediate main axle and wheels, a spring-supported bolster on one end of the truck, a semi-spherical center plate mounted on said bolster to receive said trunnion, a supplementary axle and wheels at the opposite end of the truck, side bearings normally operative mounted on said bolster engaging said car body, and supplementary side bearings abnormally operative located adjacent the other end of the truck adapted to engage said car body.

3. In combination, a car body, a trunnion secured to the car body, a socket plate therefor, a truck for supporting said socket plate, means on said truck for retaining said trunnion in said socket plate, a vestibule, and means for supporting said vestibule on said means for retaining said trunnion in said socket plate.

4. In combination, a truck comprising a two-part frame, adjacent centrally-arranged spring-supported bolsters, one bolster on each truck, adjacent abutting socket plates carried thereby, one socket plate on each truck, main axles and wheels located intermediate the ends of each part of said two-part frame, and supplementary axles and wheels located adjacent the ends of said frames, and a two-part trunnion, one part carried by one car and the other part carried by the other car, and both parts having contours complementary to the two-part socket plate.

5. In combination, a truck comprising a two-part frame, adjacent centrally-arranged spring-supported bolsters, one bolster on each truck, adjacent abutting socket plates carried thereby, one socket plate on each truck, main axles and wheels located intermediate the ends of each part of said two part frame, supplementary axles and wheels located adjacent the ends of said frames, and means for raising and lowering said supplementary axles and wheels, and a two-part trunnion, one part carried by one car and the other part carried by the other car, and both parts having contours complementary to the two-part socket plate.

6. In combination, a truck comprising a two-part frame, adjacent centrally-arranged spring-supported bolsters, adjacent abutting socket plates carried thereby, main axles and wheels located intermediate the ends of each part of said two-part frame, supplementary axles and wheels located adjacent the ends of said frames, means for raising and lowering said supplementary axles and wheels, supplementary side bearings mounted on said frames, and means of raising and lowering said side bearings.

7. In combination, a truck comprising a two-part frame, means for joining said two frame parts, main axles and wheels for each of said frame parts, spring-supported bolsters on each of said frame parts adjacent the juncture of the frame parts, abutting center plates carried on said respective bolsters, trunnions supporting car bodies mounted on said respective center plates and abutting one another on the same plane of division as the center plates.

8. In combination, a truck comprising a two-part frame, means for joining said two frame parts, main axles and wheels for each of said frame parts, spring-supported bolsters on each of said frame parts adjacent the juncture of the frame parts, abutting center plates carried on said respective bolsters, trunnions supporting car bodies mounted on said respective center plates and abutting one another on the same plane of division as the center plates, retaining means for said trunnions in said center plates mounted on said bolsters and abutting one another on the same plane.

9. In combination, a truck comprising a two-part frame, means for joining said two frame parts, main axles and wheels for each of said frame parts, spring-supported bolsters on each of said frame parts adjacent the juncture of the frame parts, abutting center plates carried on said respective bolsters, trunnions supporting car bodies mounted on said respective center plates and abutting one another on the same plane of division as the center plates, retaining means for said trunnions in said center plates mounted on said bolster and abutting one another on the same plane, a lengthwise divided vestibule support universally mounted with its respective halves in said supporting means adapted to turn therewith, and a vertically divided vestibule supported thereby and overlapping the car bodies.

10. In combination, independent car bodies having adjacent depending trunnions, independent trucks and center plates for each of said car bodies and trunnions, and means to connect said trucks and center plates in abutting relationship.

11. In combination, independent car bodies having adjacent depending trunnions, independent trucks and center plates for each of said car bodies and trunnions, means to connect said trucks and centerplates in abutting relationship, and independent retaining means on each of said trucks for retaining the trunnions and the center plates and adapted, when the trucks are joined, to be in abutting relationship.

12. In combination, independent car bodies having adjacent depending trunnions, independent trucks and center plates for each of said car bodies and trunnions, means to connect said trucks and center plates in abutting relationship, independent retaining means on each of said trucks for retaining the trunnions in the center plates when the trucks are connected together and in abutting relationship, independent vestibule supports and vestibule halves so arranged as to be supported by said supporting means and to turn therewith when the trucks are joined to be in abutting relationship.

13. In combination, a car body, a depending vertically disposed semi-spherical trunnion, a semi-spherical receiving center plate, a semi-spherical retaining means mounted within said trunnion to retain it within said socket plate, and a vestibule-supporting means having a semi-spherical head mounted within said retaining means for universal movement therein.

14. In combination, a car body, a depending vertically disposed semi-spherical trunnion, a semi-spherical receiving center plate, a semi-spherical retaining means mounted within said trunnion to retain it within said socket plate, a vestibule-supporting means having a semi-spherical head mounted within said retaining means for universal movement therein, and means on said retaining means engaging with the vestibule-supporting means to cause the vestibule to turn with the retaining means.

15. In combination, a truck comprising two independent frames, means for guiding said frames into engagement with one another, means for detachably attaching the frames to one another, a centrally-disposed main axle and pair of wheels on each frame, a supplementary axle and pair of wheels on the end of each frame, means for raising and lowering the supplemental axles and wheels, motors mounted to drive said main axles and wheels suspended from between said main axles and said frame, and means for universally supporting a car body on each end of each frame adjacent the abutting ends of the frames.

16. The combination with two car bodies and a truck frame comprising two parts or members, and means to attach and detach the two parts, of a pair of main wheels mounted in each part of the truck, a pair of supplementary wheels also mounted in each part of the truck, the latter wheels being capable of being lowered to ride on the rails and of being raised above the rails; one socket plate mounted in each part of the truck, and a trunnion mounted in each car and located within said socket; whereby the two truck members may be used as a unit and also used separately, and whereby when used separately each part of the truck will be carried by one pair of main wheels and one pair of supplementary wheels, while when the truck halves are interconnected, the truck will be carried by the pairs of main wheels, one pair mounted in each part of the truck; and whereby two car bodies will be supported when the truck parts are connected together; and whereby each car body will be supported on a part of the truck when the truck parts are disconnected.

17. In railway cars, the combination with the adjacent ends of two car bodies, an articulated support for these car ends, of a truck on which said articulated support is mounted, and means for permitting longitudinal separation of the cars, such truck structure having means to support each car independently when such car is longitudinally removed from its companion car, and wheel members supporting such truck structure; two of which wheel members are supplementary to the other wheel members, the supplementary wheels being adapted to be positioned on the rails and above and off the rails.

18. In railway cars, the combination with adjacent ends of two car bodies, a two-part truck, both parts being common to both cars when the parts are connected together, means for coupling and uncoupling such parts, and one part serving one car and the other part serving the other car when the truck parts are disconnected; and car supporting means for the ends of the cars, such means comprising a two-part socket plate, whose parts are separable from each other, and are mounted on the truck, and a two-part trunnion whose parts are separable, one part connected to one car body, and the other part connected to the adjacent car body, whereby a longitudinal separation of the cars is permissible; said truck parts each having two pairs of supporting wheels, one pair being supplementary to the other, and adapted to be maintained above the rails and lowered upon the rails.

DAVID M. RITCHIE.